(12) United States Patent
Ryon et al.

(10) Patent No.: US 12,716,390 B2
(45) Date of Patent: Aug. 25, 2026

(54) SELF-CLEANING FOR TORCH IGNITORS

(71) Applicant: Delavan Inc., West Des Moines, IA (US)

(72) Inventors: Jason Ryon, Carlisle, IA (US); Lev A. Prociw, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 268 days.

(21) Appl. No.: 17/460,755

(22) Filed: Aug. 30, 2021

(65) Prior Publication Data

US 2023/0060569 A1 Mar. 2, 2023

(51) Int. Cl.
*F02C 7/30* (2006.01)
*F02C 7/264* (2006.01)

(52) U.S. Cl.
CPC ................ *F02C 7/30* (2013.01); *F02C 7/264* (2013.01); *F23D 2900/00002* (2013.01); *F23D 2900/00016* (2013.01); *F23R 2900/00004* (2013.01)

(58) Field of Classification Search
CPC .... F02C 7/30; F02C 7/26; F02C 7/264; F23R 2900/00004; B08B 7/0071; F05D 2260/607; F23D 2209/30; F23D 2900/00016; F23D 2900/00002
See application file for complete search history.

(56) References Cited

U.S. PATENT DOCUMENTS 2,693,082 A 11/1954 Arthur
2,890,569 A 6/1959 Kittredge
4,112,675 A 9/1978 Pillsbury et al.
4,242,863 A * 1/1981 Bailey ...................... F23D 9/00 60/776
4,860,533 A * 8/1989 Joshi ...................... F02C 7/264 60/776
8,966,879 B1 * 3/2015 Munson .................... F02K 9/95 60/39.77
9,476,399 B1 * 10/2016 Munson .................... F02K 9/95
9,567,912 B2 2/2017 Prociw et al.
10,584,639 B2 * 3/2020 Dam ...................... F02C 7/264
2003/0180674 A1 * 9/2003 Pellizzari .............. F02M 53/06 431/11
2004/0168442 A1 9/2004 Schmotolocha et al.
2005/0053876 A1 3/2005 Joos et al.
2011/0173982 A1 7/2011 Prociw et al.
2016/0047318 A1 2/2016 Dam et al.
2019/0010872 A1 1/2019 Dam et al.
(Continued)

FOREIGN PATENT DOCUMENTS

CN 102677074 A 9/2012
EP 2813683 A1 12/2014

OTHER PUBLICATIONS

Extended European Search Report dated Jan. 16, 2023, issued during the prosecution of European Patent Application No. EP 22192552.2.

*Primary Examiner* — Gerald L Sung
*Assistant Examiner* — Jingchen Liu
(74) *Attorney, Agent, or Firm* — Kinney & Lange, P.A.

(57) ABSTRACT

A method of operating and cleaning a torch ignitor for continuous ignition includes issuing a fuel-lean flow through a combustion chamber of a torch ignitor. The method also includes heating interior surfaces of the torch ignitor, wherein the fuel-lean flow reacts with carbon deposits on the interior surfaces to remove the carbon deposits.

15 Claims, 2 Drawing Sheets

(56) References Cited

U.S. PATENT DOCUMENTS

2020/0224552 A1* 7/2020 Millhaem ............. F01D 25/002
2020/0309378 A1* 10/2020 Dam ....................... F23R 3/346
2021/0087972 A1* 3/2021 Turcotte .................... F02C 7/26
2021/0215100 A1 7/2021 Head et al.

* cited by examiner

SELF-CLEANING FOR TORCH IGNITORS

BACKGROUND

1. Field

The present disclosure relates to continuous ignition systems, and more particularly to torch ignitors for lighting and relighting gas turbine engines.

2. Description of Related Art

A small, independent torch igniter system offers many advantages for gas turbine engines. As the torch device can operate in a fuel rich mixture, there is a potential that carbon can develop in a variety of locations such as internal to the fuel nozzle, on the nozzle tip, on the dome surface, on the combustor liner surface, and on the glow plug surfaces. This carbon growth can also occur as a function of shutdown of the torch, where fuel can drip, stagnant fuel can sit within the injector and torch, and evaporated fuel can condense on cooler surfaces. If this carbon is allowed to grow uncontrolled, it could potentially block fuel spray deteriorating performance, or large clumps of carbon can break off which could potentially plug circuits within the torch, and/or cause erosion to downstream components. So maintenance of torch devices is needed to avoid excessive carbon growth.

The conventional techniques have been considered satisfactory for their intended purpose. However, there is an ever present need for improved systems and methods for maintenance of torch devices for continuous combustion. This disclosure provides a solution for this need.

SUMMARY

A method of operating and cleaning a torch ignitor for continuous ignition includes issuing a fuel-lean flow through a combustion chamber of a torch ignitor. The method also includes heating interior surfaces of the torch ignitor, wherein the fuel-lean flow reacts with carbon deposits on the interior surfaces to remove the carbon deposits.

Issuing the fuel-lean flow and heating the interior surfaces can be performed as a self-cleaning cycle intermittently during flight. The method can include issuing an air fuel mixture into the combustion chamber that has a higher fuel air ratio than the fuel-lean flow, intermittently between the self-cleaning cycles. Issuing the air fuel mixture into the combustion chamber that has a higher fuel air ratio than the fuel-lean flow can include issuing a flame from the combustion chamber of the torch ignitor into a combustion space of a main combustor of a gas turbine engine.

Issuing the flame from the combustion chamber of the torch ignitor into the combustion space of a main combustor of a gas turbine engine can be performed while sustaining combustion within the combustor of the gas turbine engine while issuing the flame from the torch ignitor into the main combustor. Sustaining combustion within the combustor of the gas turbine engine can include powering a turbine section of the gas turbine engine using combustion products from the combustor, and driving a compressor section of the gas turbine engine with the turbine section to supply compressed air to the combustor for combustion.

The method can include issuing an air fuel mixture into the combustion chamber that is richer than the fuel-lean flow both before and after issuing the fuel-lean flow through the combustion chamber. Issuing a fuel-lean flow through the combustion chamber can include turning down fuel flow while maintaining air flow issued into the combustion chamber to lower the fuel to air ratio.

Issuing the fuel-lean flow and heating the interior surfaces can be performed as a self-cleaning cycle as part of an engine shutdown process. The method can include shutting down an engine to which the torch ignitor is operatively connected. Issuing the fuel-lean flow and heating the interior surfaces can be performed during a maintenance cycle on an engine while the engine is out of service for maintenance.

Heating interior surfaces of the torch ignitor can include energizing an ignitor within the combustion chamber. Issuing a fuel-lean flow can include issuing air into the combustion chamber without issuing fuel into the combustion chamber. Heating interior surfaces of the torch ignitor can include sustaining combustion within the combustion chamber by issuing a fuel lean mixture of fuel and air into the combustion chamber.

Issuing a fuel-lean flow and heating interior surface can be performed in a torch ignitor in a gas turbine engine while the gas turbine engine is on an aircraft. Issuing the fuel-lean flow can include issuing air into the combustion chamber of the torch ignitor from a compressed air source separate from a main compressor of a gas turbine engine. Issuing the fuel-lean flow can include issuing air into the combustion chamber of the torch ignitor from a compressor section of a gas turbine engine.

Issuing the fuel-lean flow can include issuing oxygen gas in a mixture with less than 79% nitrogen into the combustion chamber of the torch ignitor. Issuing the fuel-lean flow and heating interior surfaces can be performed for a period of time sufficient to remove carbon build up on the interior surfaces built up since a previous cycle of issuing the fuel-lean flow and heating interior surfaces.

The interior surfaces can include at least one of: internal to a fuel nozzle of the torch ignitor, external surfaces of the fuel nozzle, on a nozzle tip of the fuel nozzle, on a dome surface of the combustion chamber, on a combustor liner surface of the combustion chamber, in interior surface of an exhaust tube of the combustion chamber, and/or on glow plug surfaces in the combustion chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
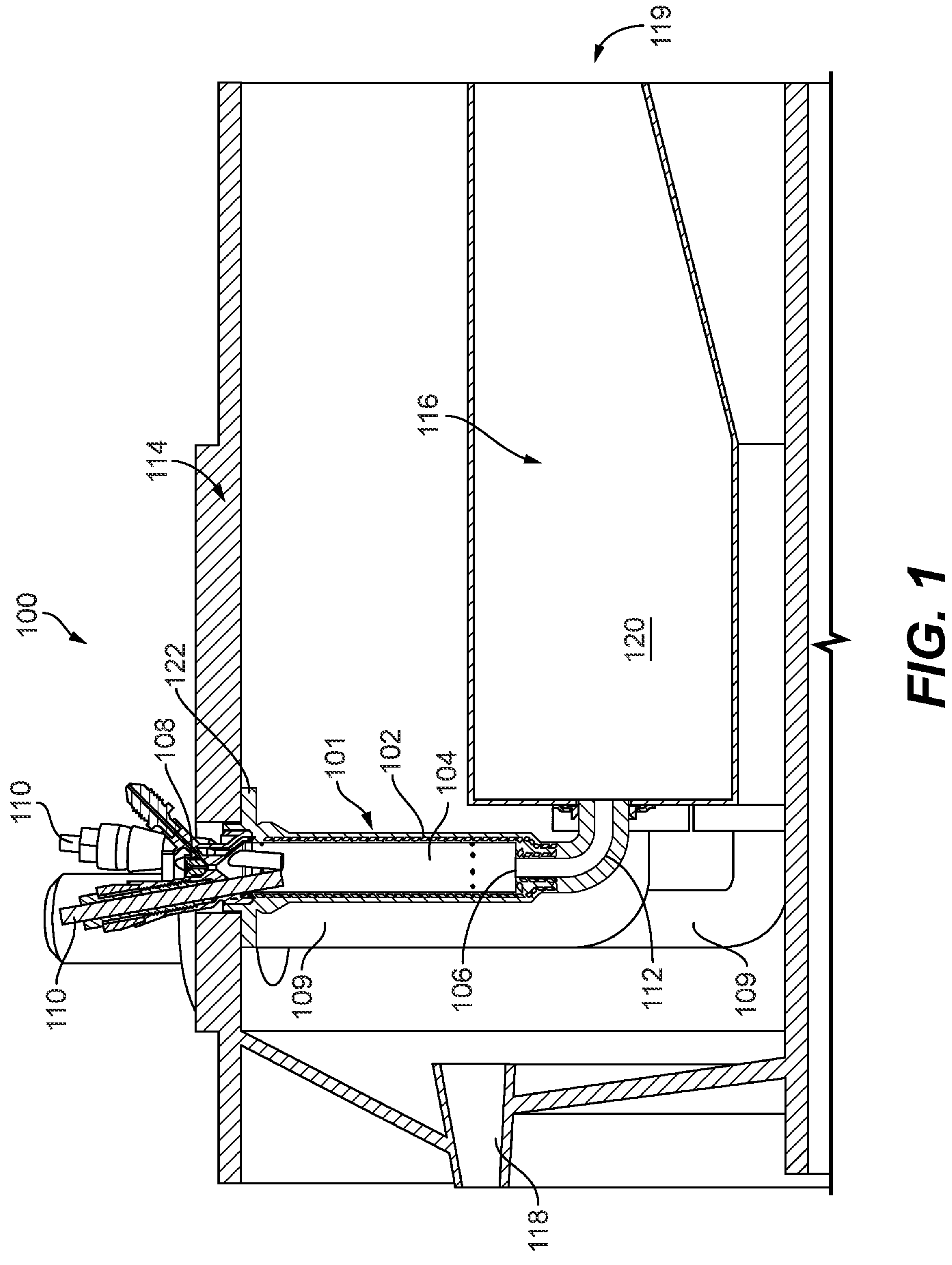
FIG. 1 is a schematic cross-sectional side elevation view of an embodiment of a system constructed in accordance with the present disclosure, showing the torch ignitor installed in a gas turbine engine for continuous ignition.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2 as will be described. The systems and methods described herein can be used to reduce and/or remove carbon deposits from surfaces of torch ignitors for continuous ignition in gas turbine engines.

The torch ignitor system 100 includes a torch ignitor 101 having a torch wall 102. The torch wall 102 defines a combustion chamber 104 therein with a flame outlet 106 passing out of the torch wall 102 downstream of the combustion chamber 104. A fuel nozzle 108 is mounted to the torch wall 102 to issue fuel into the combustion chamber 104. At least one ignitor 110 is mounted to the torch wall 102, positioned to ignite fuel issued from the fuel nozzle 108. An exhaust or outlet tube 112 is in fluid communication with the combustion chamber 104 extending downstream from the flame outlet 106.

The torch wall 102 is mounted to an engine case 114 of a gas turbine engine. A combustor 116 is included within the engine case 114, e.g. for receiving compressor discharge air from an upstream compressor (not shown but the diffuser 118 of the compressor is labeled in FIG. 1), combusting fuel in the compressor discharge air, and issuing combustion products to a downstream turbine, the inlet 119 of which is labeled in FIG. 1. The flame outlet 106 is mounted in fluid communication, through outlet tube 112, with an interior combustion space 120 of the combustor 116. The combustor 116 is spaced apart from the combustion chamber 104 of the torch wall 102, so at start up or in the event of a flame out in the main combustion space 120, a flame from the combustion chamber 104 can issue through the outlet tube 112 and into the combustion space 120 to light or relight the combustor 116.

The torch combustion chamber 104 is mostly isolated from the main combustor 116. The narrow outlet tube 112 acts as an isolator which limits communication between the two volumes. This isolation allows the torch combustion chamber 104 to be stable while the main combustor 116 could have strong pressure oscillations which happen during ignition, blowout, acoustic instabilities, and the like. The torch combustion chamber 104 is also generally sheltered from the main combustor flow field so recirculation patterns, high velocity zones, and the like do not make their way up into the torch combustion chamber 104.

A mounting flange 122 extends from the torch wall 102 and is mounted to the engine case 114. The ignitors 110 extend from outside the engine case 114, through the mounting flange 122 and into the combustion chamber 104 for igniting a mixture of fuel and air from the fuel nozzle 108 to start up the torch ignitor system 100. The fuel nozzle 108 is mounted on an opposite side of the flange 122 from the combustion chamber 104.

The torch ignitor 101 is in addition to a plurality of main fuel injectors 109 extending through the case 114 and connecting to the combustor 116 for injection of fuel and air into the combustion space 120. Only two main fuel injectors 109 are shown in the annular cross-section of FIG. 1, however those skilled in the art will readily appreciate that any suitable number of main fuel injectors 109 can be included.

Figure 2:
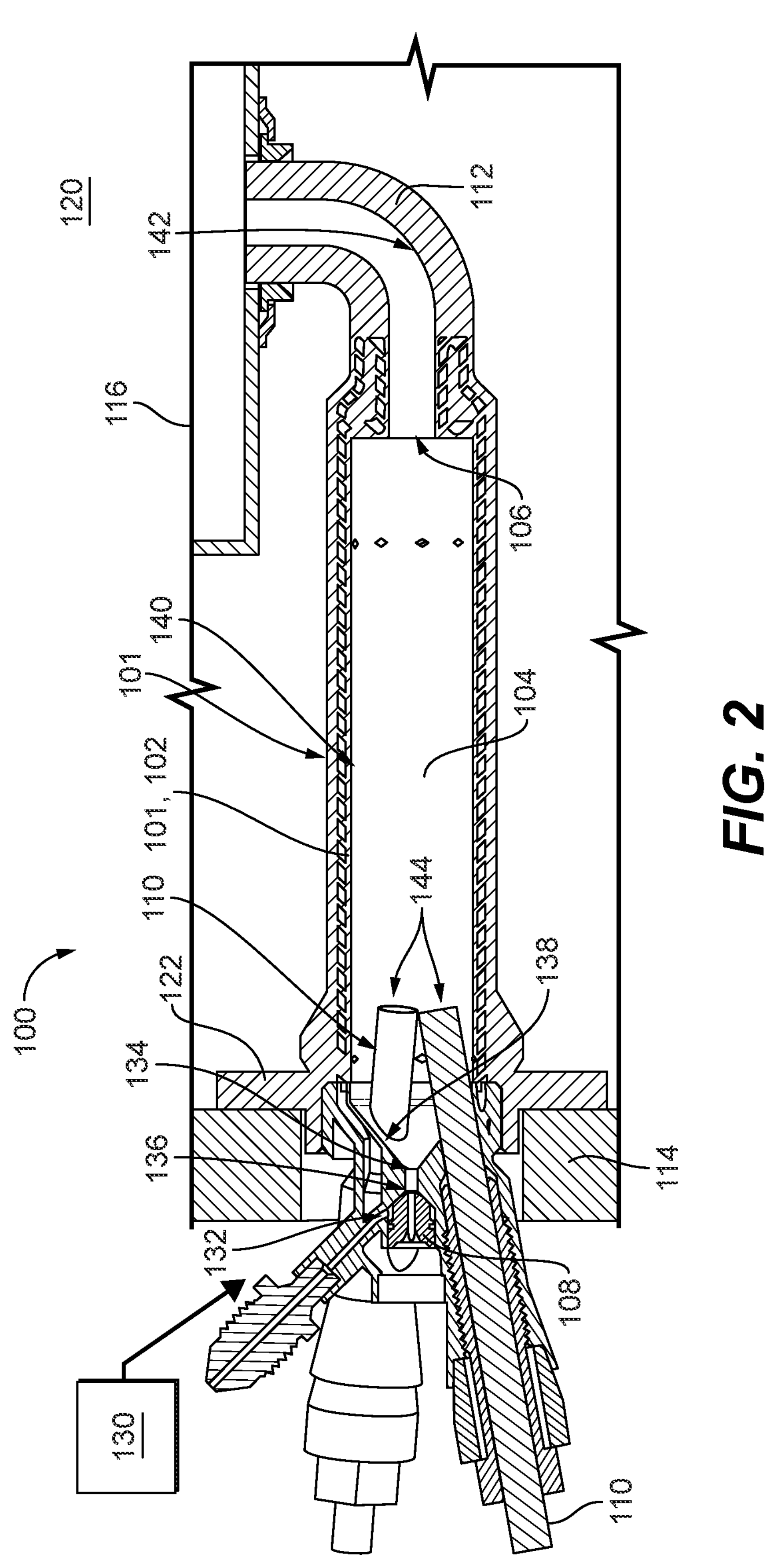
FIG. 2 is a schematic cross-sectional side elevation view of the torch ignitor of FIG. 1, showing interior surfaces of the torch ignitor where carbon deposits can be removed by fuel-lean heating.

With reference now to FIG. 2, a method of operating and cleaning a torch ignitor 101 for continuous ignition includes issuing a fuel-lean flow from the nozzle 108 through a combustion chamber 104. The method also includes heating interior surfaces of the torch ignitor 101, wherein the fuel-lean flow reacts with carbon deposits on the interior surfaces to remove the carbon deposits.

Issuing the fuel-lean flow and heating the interior surfaces can be performed as a self-cleaning cycle intermittently during flight, or if the torch ignitor 101 is on a ground-operated gas turbine engine, the self-cleaning cycle can be run intermittently during normal operation. The method includes issuing an air fuel mixture into the combustion chamber that has a higher fuel air ratio than the fuel-lean flow. This higher fuel air ratio flow can be issued intermittently between the self-cleaning cycles. Issuing the air fuel mixture into the combustion chamber at the higher fuel air ratio includes issuing a flame from the combustion chamber 104 of the torch ignitor 101 into a combustion space 120 of a main combustor 116 of a gas turbine engine.

Issuing the flame from the combustion chamber 104 of the torch ignitor 101 into the combustion space 120 of the main combustor 116 is performed while sustaining combustion within the combustor 116 of the gas turbine engine, while issuing the flame from the torch ignitor 101 into the main combustor 116. Sustaining combustion within the combustor 116 includes powering a turbine section, the inlet 119 of which is labeled in FIG. 1, using combustion products from the combustor 116, and driving a compressor section (the diffuser outlet 118 of which is indicated in FIG. 1) with the turbine section to supply compressed air to the combustor 116 for combustion.

The method includes issuing an air fuel mixture from the fuel nozzle 108 into the combustion chamber 104 that is richer than the fuel-lean flow both before and after issuing the fuel-lean flow through the combustion chamber 104. Issuing a fuel-lean flow through the combustion chamber 104 includes turning down fuel flow while maintaining air flow issued from the nozzle 108 into the combustion chamber 104 to lower the fuel to air ratio.

It is also contemplated that in addition to or in lieu of intermittent cleaning cycles during normal engine operation, issuing the fuel-lean flow and heating the interior surfaces can be performed as a self-cleaning cycle as part of an engine shutdown process. This method includes shutting down the gas turbine engine to which the torch ignitor 101 is operatively connected. It is also contemplated that issuing the fuel-lean flow and heating the interior surfaces can be performed during a maintenance cycle on an engine while the engine is out of service for maintenance. For engines on aircraft, the self-cleaning cycles can be run with the engine "on wing" whether the engine is actually located on the wing of the aircraft or elsewhere.

One way of heating the interior surfaces of the torch ignitor 101 in the self-cleaning process includes energizing one or more of the ignitor 110 within the combustion chamber 104. In this technique, issuing a fuel-lean flow includes issuing air into the combustion chamber 104 without issuing fuel into the combustion chamber 104. It is also contemplated that heating the interior surfaces of the torch ignitor 101 can include sustaining combustion within the combustion chamber by issuing a fuel lean mixture of fuel and air into the combustion chamber 104 from nozzle 108.

Issuing the fuel-lean flow can include issuing compressor discharge air into the combustion chamber 104 of the torch ignitor 101 from the main compressor, the outlet 118 of which is indicated in FIG. 1, or from a compressed air source 130 separate from a main compressor. It is also contemplated that instead of using compressed air, a compressed flow of oxygen gas can be used as the oxidant for the self-cleaning cycle. For this purpose, oxygen gas can be any gas mixture with more than 21% oxygen and less than 79% nitrogen. The self-cleaning cycle can be performed for a period of time sufficient to remove carbon build up on the interior surfaces that has built up since a previous self-cleaning cycle, thus maintaining the carbon build up levels below an acceptable operational limit.

Some examples of the interior surfaces of the torch ignitor 101 where carbon growth can be mitigated with the self-cleaning cycle are labeled in FIG. 2. These include: surfaces 132 internal to the fuel nozzle 108, external surfaces 134 of the fuel nozzle 108, on a nozzle tip 136 of the fuel nozzle 108, on a dome surface 138 of the combustion chamber 104, on a combustor liner surface 140 of the combustion chamber 104, in interior surface 142 of an exhaust tube 112, and/or on glow plug surfaces 144 in the combustion chamber 104.

Potential benefits of systems and methods as disclosed herein include self-cleaning cycles that allow the torch system to remain on wing longer and prevents erosion of downstream components. The methods and systems of the present disclosure, as described above and shown in the drawings, provide for reducing and/or removing carbon deposits from surfaces of torch ignitors for continuous ignition in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of operating and cleaning a torch ignitor for continuous ignition comprising:

issuing a fuel-lean flow having a first fuel-air ratio with at least some fuel through a combustion chamber of the torch ignitor;

heating interior surfaces of the torch ignitor, wherein the fuel-lean flow reacts with carbon deposits on the interior surfaces to remove the carbon deposits, wherein the torch ignitor is aboard an aircraft and wherein issuing the fuel-lean flow and heating the interior surfaces are performed as a self-cleaning cycle intermittently during flight of the aircraft, wherein the self-cleaning cycle is repeated as a series; and issuing an air-fuel mixture into the combustion chamber, which has a second fuel-air ratio that is higher than the first fuel-air ratio of the fuel-lean flow, is performed as a series and intermittently between the series of self-cleaning cycles, so issuing the fuel-lean flow, which has the first fuel-air ratio, of each of the series of self-cleaning cycles alternates with each of the series of issuing the air-fuel mixture, which has the second fuel air ratio.

2. The method as recited in claim 1, wherein each of the series of issuing the air-fuel mixture into the combustion chamber, which has the second fuel-air ratio that is higher than the first fuel-air ratio of the fuel-lean flow, includes issuing a flame from the combustion chamber of the torch ignitor into a combustion space of a main combustor of a gas turbine engine of the aircraft.

3. The method as recited in claim 2, wherein one of issuing the flame from the combustion chamber of the torch ignitor into the combustion space of the main combustor of the gas turbine engine of the series of issuing the flame is performed along with combustion within the main combustor of the gas turbine engine.

4. The method as recited in claim 3, wherein the continuous ignition sustains combustion within the main combustor of the gas turbine engine and includes:

powering a turbine section of the gas turbine engine using combustion products from the main combustor; and driving a compressor section of the gas turbine engine with the turbine section to supply compressed air to the main combustor.

5. The method as recited in claim 1, further comprising:

prior to a first of issuing the fuel-lean flow through the combustion chamber of the series of issuing the fuel-lean flow, a first of issuing the air-fuel mixture into the combustion chamber of the series of issuing the air-fuel mixture, which has the second fuel-air ratio that is higher than the first fuel-air ratio of the fuel-lean flow, is performed; and after the first of issuing the fuel-lean flow through the combustion chamber, a second of issuing the fuel-air mixture into the combustion chamber of the series of issuing the air-fuel mixture, which has the second fuel-air ratio that is higher than the first fuel-air ratio of the fuel-lean flow, is performed.

6. The method as recited in claim 1, wherein issuing the fuel-lean flow and heating the interior surfaces are performed as a self-cleaning cycle as part of an engine shutdown process.

7. The method as recited in claim 6, wherein the engine shutdown process further comprises shutting down an engine to which the torch ignitor is operatively connected.

8. The method as recited in claim 1, further comprises issuing the fuel-lean flow and heating the interior surfaces are performed during a maintenance cycle on an engine while the engine is out of service for maintenance.

9. The method as recited in claim 1, wherein at least one of the series of heating the interior surfaces of the torch ignitor includes energizing an ignitor within the combustion chamber.

10. The method as recited in claim 1, wherein at least one of the series of issuing the fuel-lean flow includes issuing air into the combustion chamber of the torch ignitor from a compressed air source separate from a main compressor of a gas turbine engine.

11. The method as recited in claim 1, wherein at least one of the series of issuing the fuel-lean flow includes issuing air into the combustion chamber of the torch ignitor from a compressor section of a gas turbine engine.

12. The method as recited in claim 1, wherein at least one of the series of issuing the fuel-lean flow includes issuing oxygen gas in a mixture with less than 79% nitrogen into the combustion chamber of the torch ignitor.

13. The method as recited in claim 1, wherein at least one of the series of issuing the fuel-lean flow and heating the interior surfaces is performed for a period of time sufficient to remove the carbon deposits that have been built up on the interior surfaces since issuing the fuel-lean flow and heating the interior surfaces of a previous one of the series of issuing the fuel-lean flow and heating the interior surfaces was performed.

14. A method of operating and cleaning a torch ignitor for continuous ignition comprising:

issuing a fuel-lean flow through a combustion chamber of the torch ignitor, wherein the fuel-lean flow has a first fuel-air ratio;

heating interior surfaces of the torch ignitor, wherein the fuel-lean flow reacts with carbon deposits on the interior surfaces to remove the carbon deposits, wherein the interior surfaces include at least one of: a surface of a dome of the combustion chamber, a combustor liner surface of the combustion chamber, and interior surface of an exhaust tube of the combustion chamber, and/or glow plug surfaces in the combustion chamber, wherein the torch ignitor is aboard an aircraft and wherein issuing the fuel-lean flow and heating the interior surfaces are performed as a self-cleaning cycle intermittently during flight of the aircraft, wherein the self-cleaning cycle is repeated as a series; and issuing an air-fuel mixture into the combustion chamber which has a second fuel-air ratio that is higher than the first fuel-air ratio of the fuel-lean flow, is performed as a series and intermittently between the series of the self-cleaning cycles, so issuing the fuel-lean flow, which has the first fuel-air ratio, of each of the series of self-cleaning cycles alternates with each of the series of issuing the air-fuel mixture, which has the second fuel air ratio.

15. The method as recited in claim 1, wherein a first of issuing the fuel-lean flow through the combustion chamber of the series of issuing the fuel-lean flow through the combustion chamber includes turning down fuel flow while maintaining air flow issued into the combustion chamber to decrease the second fuel-air ratio of the air-fuel mixture issued during a first of issuing the air-fuel mixture into the combustion chamber of the series of issuing the air-fuel mixture in order to obtain the first fuel-air ratio of the fuel-lean flow issued during the first of issuing the fuel-lean flow through the combustion chamber.

* * * * *